United States Patent [19]

Yew et al.

[11] Patent Number: 4,568,096

[45] Date of Patent: Feb. 4, 1986

[54] AUTOMATIC VEHICLE LEVEL CONTROL

[75] Inventors: Ming-Chih Yew, Rochester; Bernard J. Finn, Troy; Herbert A. Libkie, Romeo; Kenneth R. Meloche, Warren; James G. McLeish, Sterling Heights, all of Mich.

[73] Assignee: General Motors Corporation, Detroit, Mich.

[21] Appl. No.: 601,858

[22] Filed: Apr. 19, 1984

[51] Int. Cl.[4] ............................................. B60G 17/00
[52] U.S. Cl. .................................... 280/6.1; 280/707; 280/DIG. 1; 340/52 R
[58] Field of Search ............... 280/6 R, 6 H, 6.1, 707, 280/DIG. 1; 340/52 R

[56] References Cited

U.S. PATENT DOCUMENTS

| | | | |
|---|---|---|---|
| 3,632,131 | 1/1972 | Engfer | 280/707 |
| 3,633,935 | 1/1972 | Boyer | 280/707 |
| 3,873,123 | 3/1975 | Joneleit | 280/707 |
| 4,017,099 | 4/1977 | Hegel et al. | 280/707 |
| 4,105,216 | 8/1978 | Graham et al. | 280/6 R |
| 4,162,083 | 7/1979 | Zabler et al. | 280/703 |
| 4,164,664 | 8/1979 | Kasiewicz | 307/118 |
| 4,168,840 | 9/1979 | Graham | 280/6 R |
| 4,185,845 | 1/1980 | Misch et al. | 280/6 H |
| 4,361,346 | 11/1982 | Harris | 280/707 |
| 4,364,574 | 12/1982 | Saito | 280/6 R |
| 4,391,452 | 7/1983 | Ohmori | 280/6.1 |
| 4,401,310 | 8/1983 | Ishikawa et al. | 280/6.1 |
| 4,433,849 | 2/1984 | Ohmori | 280/6 R |
| 4,466,625 | 8/1984 | Kondo et al. | 280/6 R |

FOREIGN PATENT DOCUMENTS

| | | | |
|---|---|---|---|
| 167510 | 12/1981 | Japan | 280/707 |
| 105813 | 6/1983 | Japan | 280/707 |

Primary Examiner—Joseph F. Peters, Jr.
Assistant Examiner—Kenneth R. Rice
Attorney, Agent, or Firm—R. M. Sigler

[57] ABSTRACT

A level control system for a motor vehicle with an unsprung mass including a wheel, a sprung mass, and a shock absorber connecting the sprung and unsprung masses comprises fluid power apparatus activatable to level the sprung mass with respect to the unsprung mass, a sensor effective to generate a signal indicating the level of the sprung mass relative to the unsprung mass and apparatus responsive to the sensor to compute the difference between the total times, within a predetermined time period, spent by the level above and below a predetermined trim band and apparatus effective to compare the difference of the times with a reference comprising a predetermined percentage of the predetermined time period and activate the fluid power apparatus if the difference exceeds the reference in magnitude, whereby the system can maintain a narrow trim band while the vehicle is not moving while avoiding unnecessary corrections and cycling due to excursions above and below the trim band during vehicle movement over rough surfaces.

3 Claims, 12 Drawing Figures

| | PHOTO TRANSISTORS | | CPU INPUTS | |
|---|---|---|---|---|
| | 1 | 2 | MSB | LSB |
| HIGH | ON | OFF | 1 | 1 |
| TRIM | OFF | OFF | 0 | 0 |
| LOW | OFF | ON | 1 | 0 |

AUTOMATIC VEHICLE LEVEL CONTROL

BACKGROUND OF THE INVENTION

This invention relates to an automatic level control system for a vehicle having sprung and unsprung masses connected by shock absorber means and further including fluid power means activatable to level the sprung mass with respect to the unsprung mass by increasing or decreasing a fluid pressure in response to electrical signals. Such a control further includes sensor apparatus to sense the relative level of the sprung and unsprung masses within a predetermined trim band. When the vehicle is standing, sprung and unsprung masses generally maintain a stable relative level between vehicle loading events; and an automatic level control may be straightforward and simple in design. However, when the vehicle is moving over rough surfaces, the relative level of the sprung and unsprung masses is continually changing; and the design of a stable and effective automatic level control is not so straightforward.

Generally, in an automatic level control, it is desired to correct the relative level of sprung and unsprung masses following permanent changes in said level due to vehicle loading events but not to attempt to correct the level in response to oscillatory changes in said relative level caused by vehicle movement over rough surfaces or transient vehicle accelerations. This has generally been accomplished in the prior art by requiring the sensed out-of-trim condition to exist for a predetermined minimum time before initiating corrective action. This predetermined time must be sufficiently long that the level system is not activated during transient out-of-trim events due to vehicle braking and cornering. Such a time period might be, for example, ten seconds. But during vehicle operation on a rough road for such a time, the vehicle wheels and unsprung mass may oscillate in and out of the predetermined trim band many times and thus prevent the completion of any ten second duration of an out-of-trim condition which is begun.

In addition, many shock absorbers for motor vehicles are provided with greater damping in extension than in compression. The result is that, during the vehicle passage over rough surfaces, the vehicle tends to ride down slightly on the shock absorbers due to the greater ease with which the shock absorbers may be compressed. Thus, there is the possibility for such a vehicle that, in travel over rough surfaces, the level might be indicated as below, within and above the trim band within a short time, regardless of whether the actual stationary or average level of the vehicle is below, above, or within the trim band. Thus the level system must be somewhat sophisticated in design to achieve the desired result of timely levelling action in response to vehicle loading events or other changes in the average vehicle level without responding to transient events.

SUMMARY OF THE INVENTION

It is an object of this invention to provide a vehicle level system which maintains the average level between sprung and unsprung masses of the vehicle within a predetermined trim band in spite of transient excursions above and below this trim band due to road contour characteristics and transient vehicle acceleration events.

The invention contemplates a level control system for a motor vehicle with sprung and unsprung masses connected by a shock absorber effective to damp oscillatory movement therebetween and having fluid power means activatable to adjust the level by the increase or decrease of a fluid pressure therein in response to electrical signals, a sensor effective to generate a signal indicating the level of the sprung and unsprung mass within a predetermined trim band, means effective to compute the difference between the total times, within a predetermined time period, spent by said level above and below the predetermined trim band and means effective to compare the difference of said times with a reference comprising a predetermined percentage of said fluid power means if the difference exceeds said reference in magnitude. Thus, in order for the fluid power means to be activated to change the vehicle level, the level need not be out of the trim band constantly for a time period but only for a predetermined percentage of said time period. However, in addition, said level must be out of the trim band predominantly on one side thereof, so that oscillations extending both above and below said trim band due to a very rough road surface will not be interpreted as requiring levelling action. Further details and advantages of this invention will be apparent from the accompanying drawings and following description of the preferred embodiment.

DESCRIPTION OF THE PREFERRED EMBODIMENT

Figure 1:
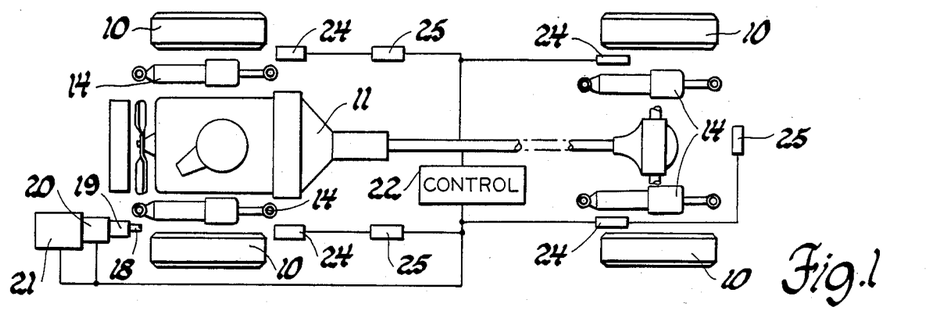
FIGS. 1 and 2 comprise schematic diagrams of a preferred embodiment of this invention.
Figure 4:
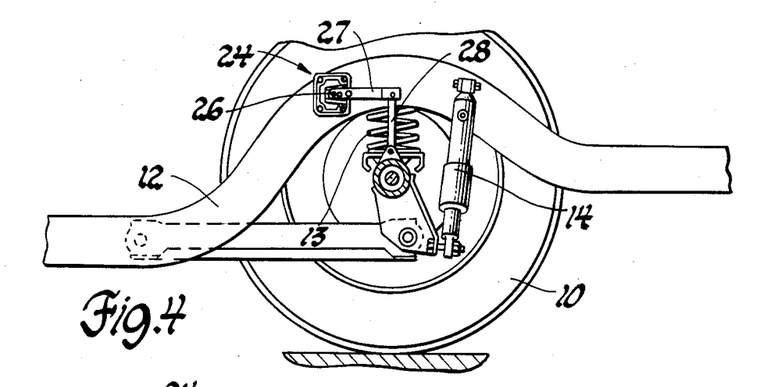
FIG. 4 shows a side elevation view of a vehicle suspension arrangement of sprung and unsprung masses including the suspension means, shock absorber and a level sensor.

Referring to FIG. 1, a motor vehicle includes four wheels 10, at least some of which are driven by a drive train 11. Each of the wheels 10 rests on the road surface, as shown in FIG. 4, and comprises part of the unsprung mass of the vehicle. Drive train 11, as well as substantially the remainder of the vehicle, is supported by a frame 12, seen in FIG. 4, and comprises the sprung mass of the vehicle. Frame 12 is supported by spring suspension apparatus 13, shown in FIG. 4 as a coil spring, on wheels 10. As shown in FIGS. 1 and 4, a shock absorber 14 associated with and adjacent each wheel 10 is physically connected between the frame 12 of the sprung mass of the vehicle and a portion of the unsprung mass of the vehicle associated with the wheel 10. Shock absorber 14 is provided for the damping of oscillatory motion between the sprung and unsprung masses at each wheel 10.

The vehicle is further provided with fluid power means for adjusting the relative vertical level between the sprung and unsprung masses by means of a compressed fluid. Each of the shock absorbers 14 is of the load-leveling variety which includes additional compressed fluid operated support means. Alternatively, spring suspension apparatus 13 might comprise an air spring unit which would itself incorporate the fluid pressure level adjustment device so that shock absorber 14 might be a conventional damping shock absorber. In either case - the load-leveling shock absorber or the air spring unit -the devices are well known and standard in the prior art.

In order to adjust the pressure within the load leveling portion of shock absorber 14 or the air spring unit, the fluid power means includes further apparatus. Each of said shock absorbers 14 is connected through a conduit 16 controlled by a valve 17 to a common conduit 18 and, through common conduit 18, to an air dryer 19, exhaust valve 20 and compressor 21. Each of the valves 17 is capable of opening or closing its respective conduit 16 between shock absorber 14 and the common conduit 18. Valves 17 are normally kept closed to maintain a constant air mass in each of the shock absorbers 14 but may be individually opened in response to electrical signals from a control unit 22. Control unit 22 is also capable of activating and deactivating compressor 21 and opening or closing exhaust valve 20. Exhaust valve 20, when closed, allows communication between conduit 18, air dryer 19 and compressor 21 but when open, exhausts conduit 18 to the atmosphere. Since exhaust valve 20 also opens compressor 21 to the atmosphere, control 22 should ensure that is is never opened while compressor 21 is operating. Air dryer 19 provides the air drying function that is typical of such load levelling systems in general. Control 22 is capable of individually adjusting the air mass or pressure in each of the shock absorbers 14 by first opening the associated valve 17 to connect that shock absorber to the common conduit 18 and then activating either the compressor 21 or exhaust valve 20 to increase or decrease the air pressure within that shock absorber. When the desired result is obtained for that shock absorber 14, the associated valve 17 is closed and the system may then adjust another of the shock absorbers 14 in a similar manner.

Control unit 22 adjusts the pressure or air mass of each shock absorber 14 in response to signals from a plurality of trim or level sensors 24, signals from one or more door/trunk sensors 25 and an ignition signal which indicates closure of the ignition switch, not shown. In this embodiment, there is a trim or level sensor associated with each wheel 10; however, a smaller number is also possible. For example, a level sensor could be provided for each of the front wheels 10 with a single level sensor midway between the rear wheels. In addition, a pair of level sensors could be provided midway between the front wheels and the rear wheels. Finally, a single level sensor could be provided midway between the rear wheels. However, the use of the four sensors 24 provides complete sensing of the level and attitude of the vehicle so that no more are necessary. The door/trunk sensor or sensors 25 generate signals upon the opening or closing of the vehicle door or trunk lid. Separate sensors may be provided for selected doors; or a sensor may sense the condition of the electric supply line to the vehicle dome or interior light, which is generally actuated with the opening of selected vehicle doors. The passenger and trunk doors, as well as the vehicle ignition switch, are vehicle accessories which indicate, with certain changes of state, the high probability of a change in vehicle load.

Figure 2:
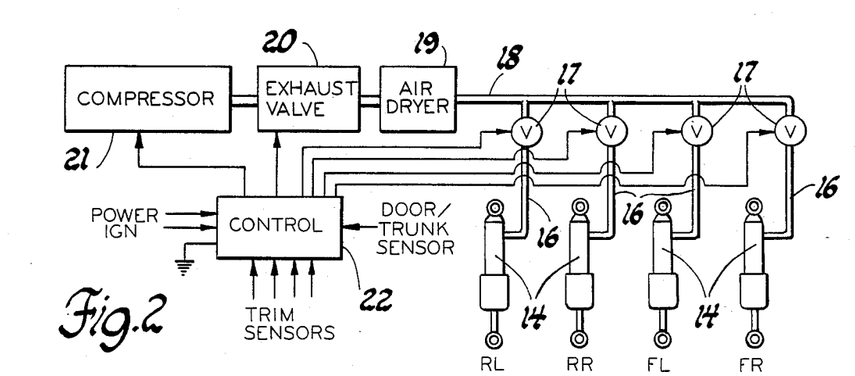
Figure 5:
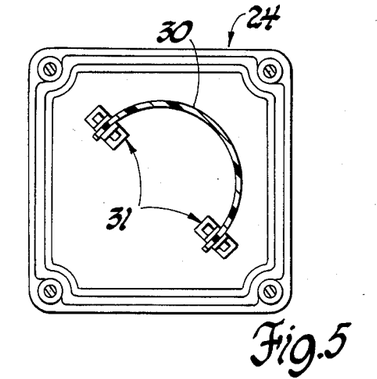
FIG. 5 shows a portion of the level sensor shown in FIG. 4.

FIGS. 4-7 illustrate a preferred embodiment of a trim or level sensor 24 for use in the systems shown in FIGS. 1 and 2. Sensor 24, shown in FIG. 4 as being affixed to frame 12, has a horizontally protruding shaft 26 with attached lever arm 27. Lever arm 27 is attached by means of suitable linkage 28 to a part of the vehicle's unsprung mass associated with wheel 10. Relative vertical motion between wheel 10 and frame 12 causes rotation of shaft 26; and there is a fixed relationship between the relative vertical level of the sprung and unsprung masses of the vehicle at the wheel 10 and the angular position of shaft 26. Within sensor 24, as seen in FIG. 5, a rotatable shutter 30 in the form of a semicircle is attached to shaft 26 by means not shown so as to be rotated through the circle defined by an extension of its semicircular shape as shaft 26 rotates. Toward each end of shutter 30 in the position shown there is a signal unit 31, each of which signal units 31 comprises a light emitting diode 32 and phototransistor 33 arranged so that shutter 30, in the position shown, blocks the transmission of light from light emitting diode 32 to phototransistor 33 but, when shutter 30 is rotated sufficiently to be physically removed from the signal unit 31, the transmission of light is permitted.

Figures 7, 8:
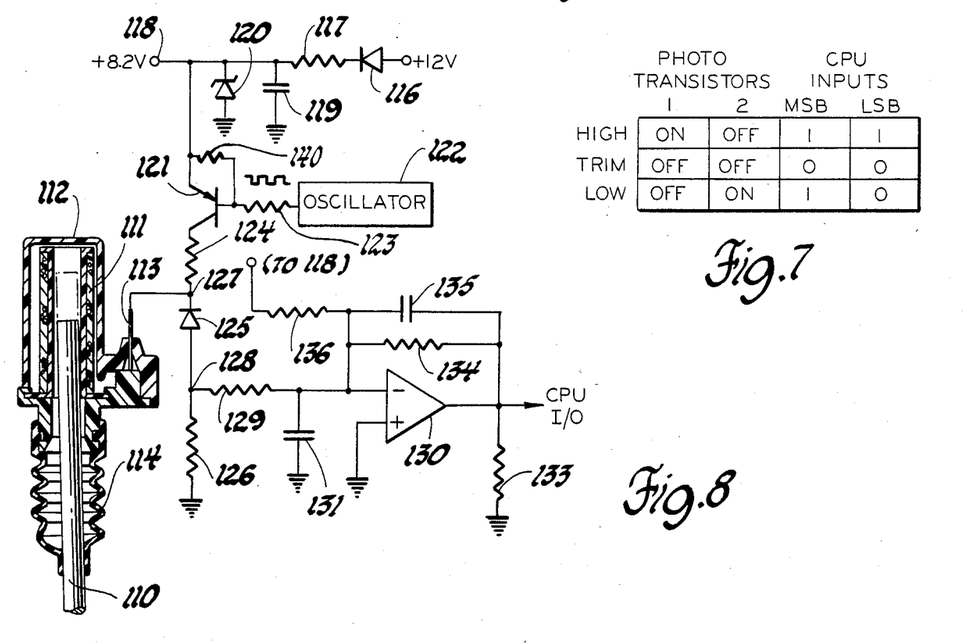
FIG. 7 is a state table for different level conditions of the circuits shown in FIGS. 3 and 6.
FIG. 8 is an alternative level sensor and circuit for use with the system of FIGS. 1 and 2.

Shutter 30 has a neutral or central position, as shown in FIG. 5, in which it extends into both signal units 31 to prevent both phototransistors 33 from being activated. This central position corresponds to the trim position in the table of FIG. 7 in which the vehicle is at the desired height relative to the road surface. As the height of the vehicle rises above the road surface, shutter 30 rotates until the first of the phototransistors 33 is exposed to light from its corresponding light emitting diode 32. This activates the first of the phototransistors as shown in the table of FIG. 7. Likewise, as the vehicle becomes lower with reference to the road surface, shutter 30 rotates in the opposite direction. As it rotates, the first of the phototransistors 33 is turned off and eventually it rotates sufficiently far that the second of the phototransistors 33 is exposed to light from its corresponding light emitting diode 32 and turns on. The arc of rotation of shutter 30 in which both phototransistors are off defines the trim band. As can be seen from FIG. 5, it is impossible for both phototransistors 33 to be activated simultaneously.

Figure 6:
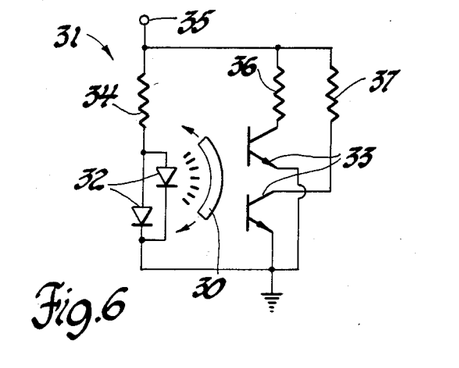
FIG. 6 comprises a circuit diagram of the level sensor shown in FIGS. 4 and 5 for use with the circuit of FIG. 3.

The electronic circuit for level sensor 24 is shown in FIG. 6. Light emitting diodes 32 are connected in parallel with each other and in series with a resistor 34 between ground and an output terminal 35. Each of the phototransistors 33 has a grounded emitter and a collector connected to output terminal 35 through one of resistors 36 and 37. Each of phototransistors 33 may be followed by additional transistors in normal amplifying arrangements for additional gain if necessary. Resistor 34 has a resistance of 180 ohms; and resistors 36 and 37 have resistance of 33 ohms and 82 ohms, respectively, so that the total effective resistance between output terminal 35 and ground differs substantially among the three possible states wherein neither phototransistor is activated, the first phototransistor only is activated or the second phototransistor only is activated. Each of the sensors 24 may alternatively be connected, as will be described at a later point in the description, in series with a regulated voltage source and a fixed resistor to form a voltage divider, with the voltage across the fixed resistor indicating the trim state of the vehicle at the location of the sensor 24.

Figure 3:
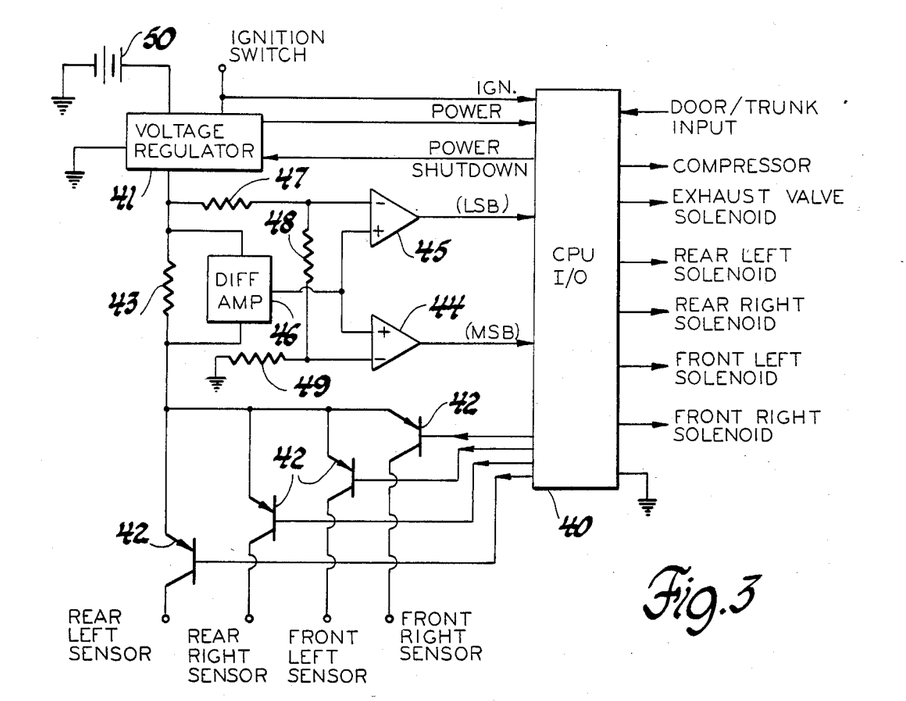
FIG. 3 comprises a circuit diagram of a portion of the control shown in FIGS. 1 and 2.

The electrical input and output connections of control 22 will be described with reference to FIG. 3. Control 22 includes digital computer apparatus including a central processing unit (CPU), clock and memory elements (RAM, ROM) interconnected in the standard manner and not shown in FIG. 3. Communication between the CPU and the electrical devices on the vehicle is accomplished through input/output (I/O) apparatus 40. I/O apparatus 40 has a plurality of digital or two-valued input and output ports individually controllable by the CPU for communicating one bit digital signals between the CPU and a variety of electrical devices. For example, an on-off output signal may be provided to compressor 21; and open-close output signals may be provided to the exhaust valve solenoid 20 and each of the solenoids 17. A power shutdown output signal may be provided to a voltage regulator 41 to allow the computer to turn itself off some predetermined time after the vehicle ignition switch is opened, power being supplied to the computer from battery 50 by way of voltage regulator 41. Additional on-off output control signals are provided to the bases of a plurality of switching transistors 42, the emitters of which are connected in common through a resistor 43 to an output of voltage regulator 41 and the collectors of which are individually connected to output terminals 35 of separate level sensors 24.

I/O apparatus 40 has further inputs from the output of two voltage comparators 44 and 45, each of which has an noninverting input connected to the output of a differential amplifier 46 having inputs connected on opposite sides of resistor 43 to sense the voltage thereacross. Three series resistors 47, 48 and 49 form a voltage divider between the output of voltage regulator 41 to which resistor 43 is connected and ground. The inverting input of comparator 45 is connected to the junction of resistors 47 and 48; and the inverting input of comparator 44 is connected to the junction of resistors 48 and 49. The values of resistors 47, 48 and 49 are selected so as to produce CPU inputs as shown in the table of FIG. 7 in response to "high", "trim" and "low" states for each of the sensors 24, which may be individually activated by the computer by means of transistors 42. Finally, an input open-closed signal is provided from the vehicle trunk and/or one or more vehicle doors; and an on-off signal is provided from the ignition switch.

Control 22 is provided with a predetermined control program to receive and process inputs and generate outputs through I/O apparatus 40 in order to control the level of the vehicle. The control program basically causes repeated sampling of the sensors 24 for predetermined time periods which differ in duration in each of a plurality of operating modes and determining, for each said sensor in each said sample, the difference between the numbers of samples, and therefore the percentage of the total time duration, in which each sensor signals out-of-trim high and out-of-trim low. This difference is commpared with a predetermined service trip point reference number for the operating mode in order to determine whether action is required or a new sample period begun.

The system has three operational modes; and the required action depends on the present operational mode. The first of said operational modes is the decision mode, in which the system is initiated and to which it returns any time action is required from either of the other modes. The sample period for decision mode is generally short, such as four seconds, so that levelling action may be initiated quickly when required. However, it is longer than the sprung mass oscillation period for the vehicle. An out-of-trim determination in decision mode puts the system in the service mode, in which leveling action is undertaken and continued until no longer necessary. Service mode is assigned an even shorter sample period, such as one second, for quick actuator shutoff when trim is achieved, to avoid overshoot. The end of service sends the system from service mode back into decision mode.

A predetermined consecutive number of decision modes within the trim band generally results in cruise mode, in which the sample period is sufficiently long, such as 60 seconds, to avoid activation of the level system in response to transient driving maneuvers such as turns, accelerations and deceleration. The exception will be discussed at a later point in this description. Out-of-trim in cruise mode sends the system back to decision mode.

The system further includes logic to determine service priorities between compression and exhaust in the various shock absorbers 14 or other activation devices used to correct the level of different portions of the vehicle. This logic is obviously only used during the service mode, applies only to multistation actuation and will be described in greater detail at a later point in this description.

In a preferred embodiment, the computer normally runs in a short loop in which the sensors are individually activated and read in turn with the least significant bit (LSB) and most significant bit (MSB) for each sensor stored temporarily in a register until the next reading of the sensor. A real time clock generates an interrupt every 25 milliseconds to perform a few tests, set an accummulator update flag and return control to the normal loop. On the next cycle of the normal loop, the accumulator update flag causes an accumulator register for each sensor to be incremented, decremented or left unchanged according to the most recent LSB and MSB which indicate the present trim state of that sensor. After a predetermined number of such updates corresponding to the sample period for the present operational mode, the values of all accumulators are compared to predetermined references for that operational mode to determine if action is required. Thereafter the program proceeds to a logic routine which selects the next mode and, in most cases, then initiates a new sample in the new mode. If the new mode is service or the first decision mode after service mode, a service routine is executed before the next sample is begun. In any mode except service, an input indicating change in state of a sensed vehicle passenger or trunk door or deactivation of the vehicle ignition switch causes the immediate cessation of the present sample period and initiation of a new sample period in the decision mode, since there is a strong possibility that a change in vehicle load accompanies said signal.

Figure 9:
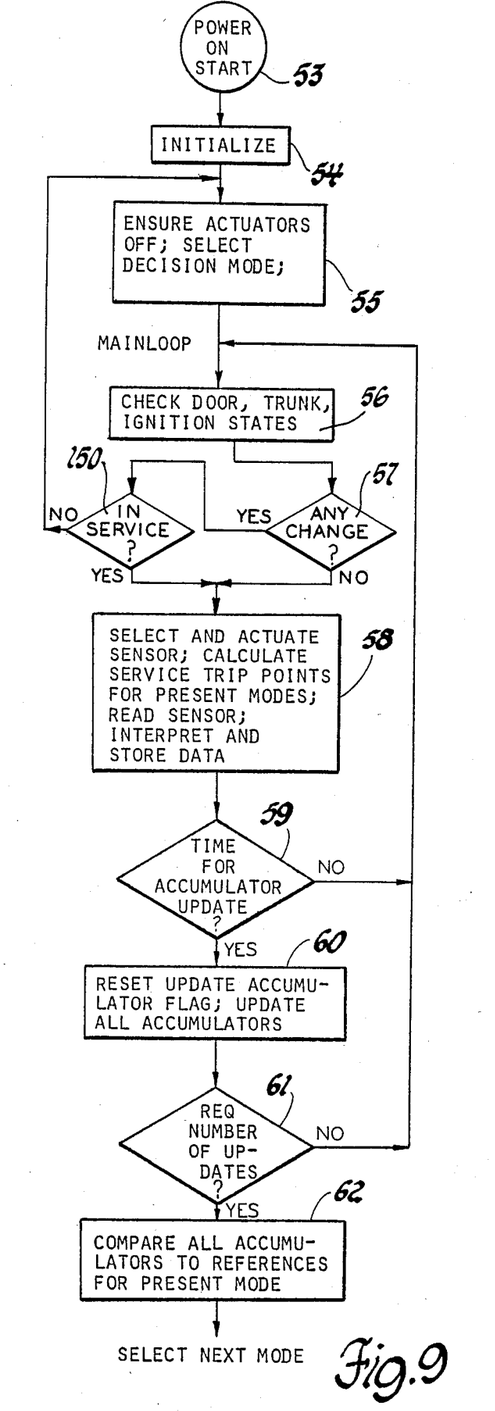
FIGS. 9-12 are computer flow charts describing the operation of the control of FIGS. 1 and 2 with the circuit of FIG. 3.

Referring in particular to FIG. 9, initial actuation of the vehicle ignition switch initiates the "power on start" routine at 53, in which the computer is initialized, including the removal of inhibits, at 54 and actuators are ensured off and decision mode is selected at 55. The aforementioned inhibits are flags which may be set to indicate a malfunction and prevent service at a particular shock absorber 14.

The control then checks for a change in a vehicle or trunk door condition or an ignition off state at 56. If there is such a condition, as noted in decision point 57 in response to a flag set by an ignition or door/trunk input to I/O apparatus 40, and if the system is not in the service mode, as noted in decision point 150, the program returns the control to step 55. If there has not been any such change or if the system is in service mode, the control selects and actuates the next sensor, calculates the service trip point for the present mode, reads the sensor and interprets and stores the sensor data in an appropriate register at 58. The sensors would ordinarily be activated and read in turn in a predetermined order.

The control next, at decision point 59, checks the accumulator update flag to see if it is time to update the accumulators for the sensors. Unless this flag has been set in the interrupt loop, the answer will be no and the control will be returned to a point labelled "MAINLOOP" just before step 56. If the flag is set, however, the control resets the flag and updates all accumulators according to the values currently in the registers corresponding to each sensor. This is accomplished essentially by incrementing each accumulator corresponding to a sensor indicating the high trim state and decrementing each accumulator corresponding to a sensor in a low trim state. An accumulator corresponding to a sensor within the trim zone is not changed. In addition, a counter is incremented to keep track of the number of such updates since the beginning of the present sample period.

The control then checks to see if the required number of updates has occurred at decision point 61. Since each update occurs in response to a 25 millisecond interrupt, a four-second decision mode period would require 160 such updates, for example. If not, the program returns to MAINLOOP. If so, however, each accumulator is compared to the reference for the present mode to determine if some action is necessary.

For example, it may be predetermined that, in the decision mode sample period of 160 samples, an accumulator total having an absolute value of 40 or greater is necessary to require action. If the 160 samples for a particular sensor has included 60 low trim samples and 10 high trim sample, the accumulator total of −50 would be sufficient to cause such action. On the other hand, 60 low trim samples and 70 high trim samples out of the total of 160 would provide an accumulator total of 10, which would be insufficient to cause such action. Thus, the vehicle must not only be out-of-trim at a particular sensor location but must also be predominantly out-of-trim in the same direction during a sample period for the accumulator total to reach a value sufficient to indicate out-of-trim for that location. Flags are set for any sensor location determined to be out-of-trim in step 62.

Figure 10:
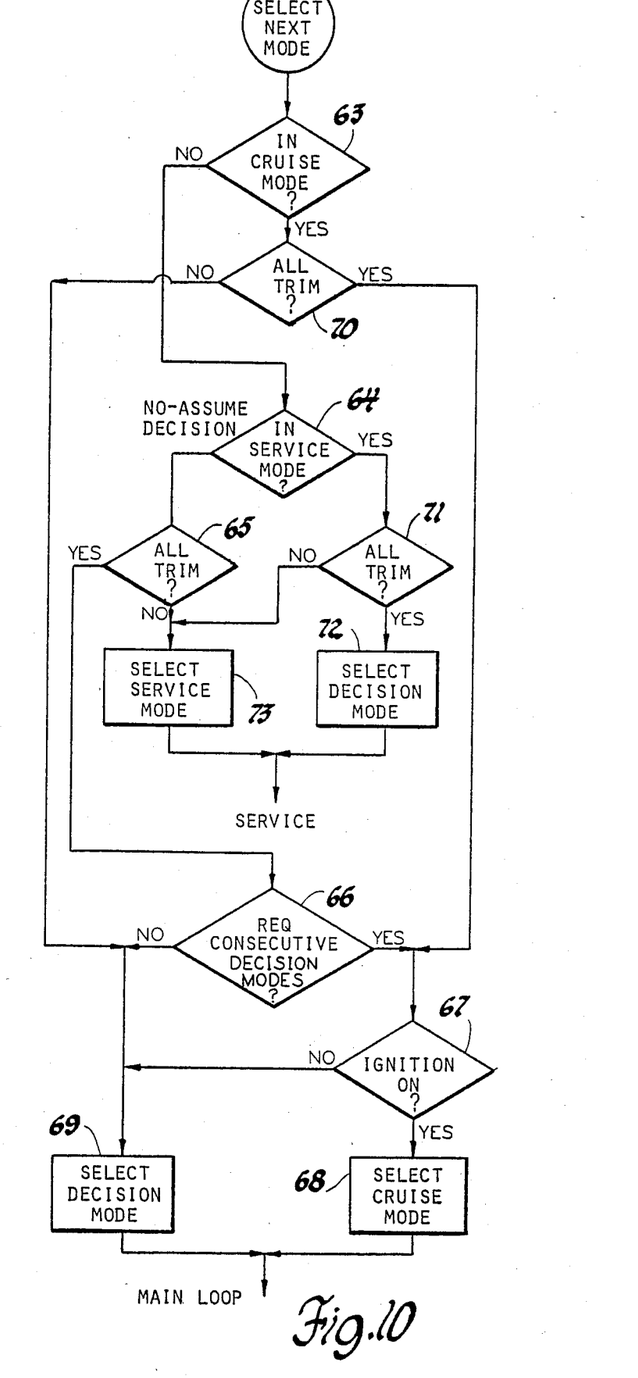

From step 62, the program proceeds to the routine entitled "Select Next Mode", as seen in FIG. 10. Decision point 63 asks if the present mode is cruise mode. If the answer is no, decision point 64 asks if the present mode is service mode. If the answer is again no, decision mode is assumed; and decision point 65 asks if all sensor locations are trim. If the answer is yes, decision point 66 asks if the required number of consecutive decision modes has occurred with all sensor locations trim. Only if the answer is yes and the ignition is on, as determined at decision point 67, is cruise mode selected at step 68 before the program is returned to MAINLOOP, in FIG. 9. If the required number of consecutive decision modes with all sensor locations trim has not occurred or if the ignition is not on, the decision mode is selected at step 69 before the program returns to MAINLOOP. Decision mode is further selected at step 69 if cruise mode is determined in decision point 63 and all sensor locations are not found to be trim at a decision point 70. On the other hand, if all sensor locations are found to be trim at decision point 70, the program proceeds to decision point 67.

Returning to decision point 64, if the present mode is found to be service mode, the program first determines if all sensor locations are trim at decision point 71 and then selects decision mode in step 72 if the answer is yes or selects service mode at step 73 if the answer is no. Service mode is selected at step 73, likewise, if all sensor locations were not found to be trim at decision point 65.

Figure 12:
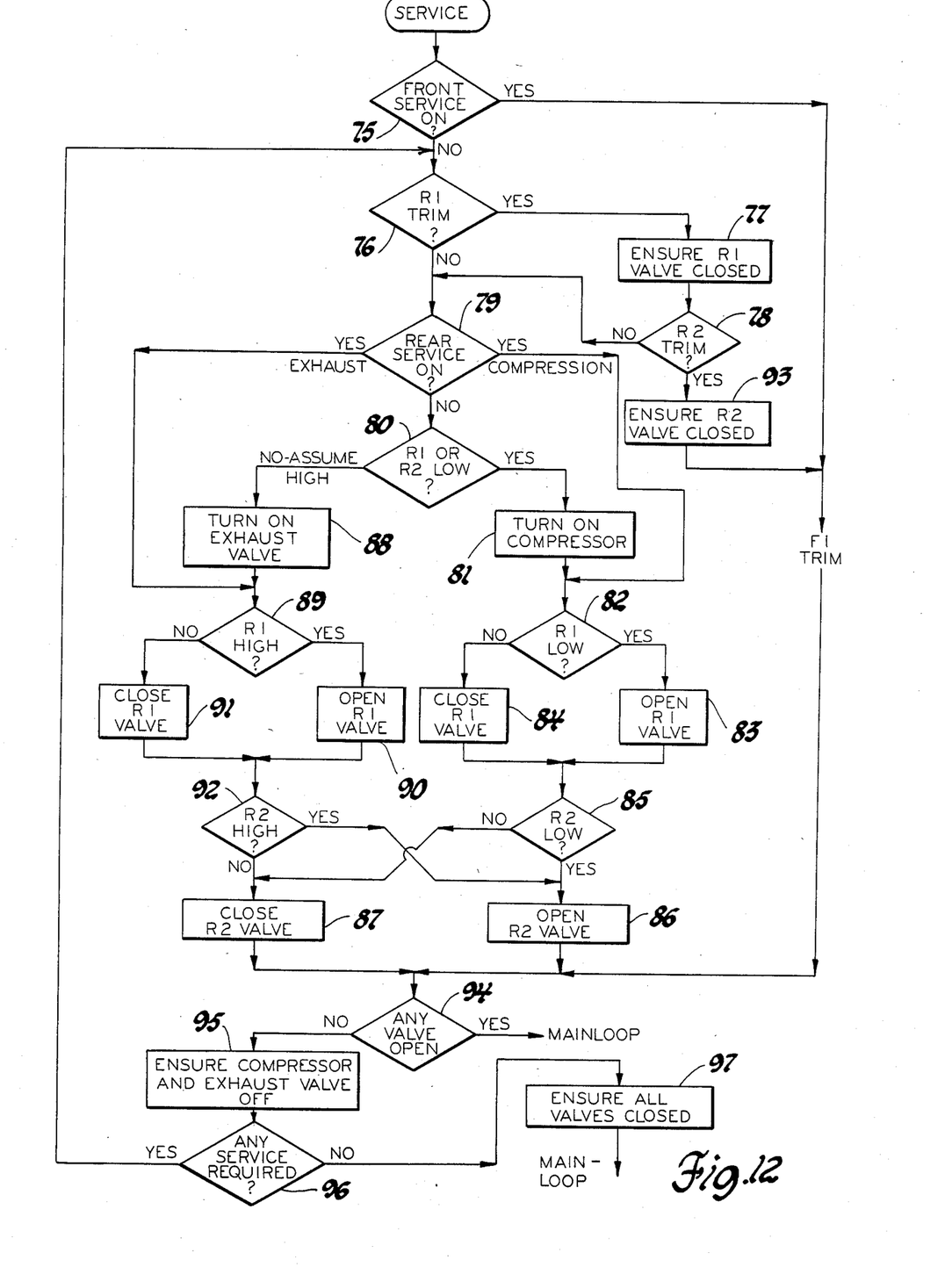

The program proceeds to a routine entitled "Service", shown in FIG. 12, either from step 73, when service has been determined to be necessary, or from step 72, in order that service might be properly terminated. This routine contains the logic to control and coordinate the compressor and various valves in order to service the various stations or shock absorbers in a predetermined priority.

First, at decision point 75, it is determined if either of the front shock absorbers or stations is presently being serviced. If not, the program asks if the first rear station (R1) is trim at decision point 76. If so, the system ensures the R1 valve closed in step 77 and asks at 78 if the second rear station (R2) is trim. If either R1 or R2 are not trim, the program asks at decision point 79 if either R1 or R2 are currently being serviced. If not, rear service is required; and the program asks, at 80, if either R1 or R2 are low. If one or both are low, the system turns on the compressor at 81 and asks, at 82, if R1 is low. If R1 is low, the system opens the R1 valve at 83; and, if R1 is not low, the system closes the R1 valve at 84. In either case, the program next asks, at 85, if R2 is low. If so, the system next opens the R2 valve at 86; and, if R2 is not low, the system closes the R2 valve at 87.

At decision point 80, if neither R1 nor R2 was low, the system assumes one or both are high and turns on the exhaust valve at 88. The program asks if R1 is high at 89, and the system opens the R1 valve at 90 if the answer is yes and closes the R1 valve at 91 if the answer is no. In either case, the program next, at 92, asks if the R2 station is high. If so, the system opens the R2 valve at 86; and if not, the system closes the R2 valve at 87. Referring back to decision point 79, if the rear service is already on in the compression mode, the program proceeds to decision point 82. However, if the rear service is already on in the exhaust mode, the program proceeds to decision point 89. From decision point 78, if R2 is determined to be trim, the R2 valve is closed in a step 93. From this step or from decision point 75, if front service is already on, the program proceeds through a portion of the flow chart which is not shown in detail in FIG. 12 but which is entitled "F1 Trim". This portion of the program is identical to that described by the items No. 76–93 with the exception that all stations are front rather than rear. Thus, the word "front" would be substituted for the word "rear" and the identifiers "F1" and "F2" for "R1" and "R2". It can thus be seen from this flow chart that the general logic of service here is to service the rear stations before the front stations and compress to raise a station before exhausting to lower a station; however, any action once begun is completed with the station left in a trim state before any other conflicting service action is taken. It can also be seen that the two rear stations may be simultaneously lowered or simultaneously raised with each being separately cut off when trim and likewise for the front stations.

Figure 11:
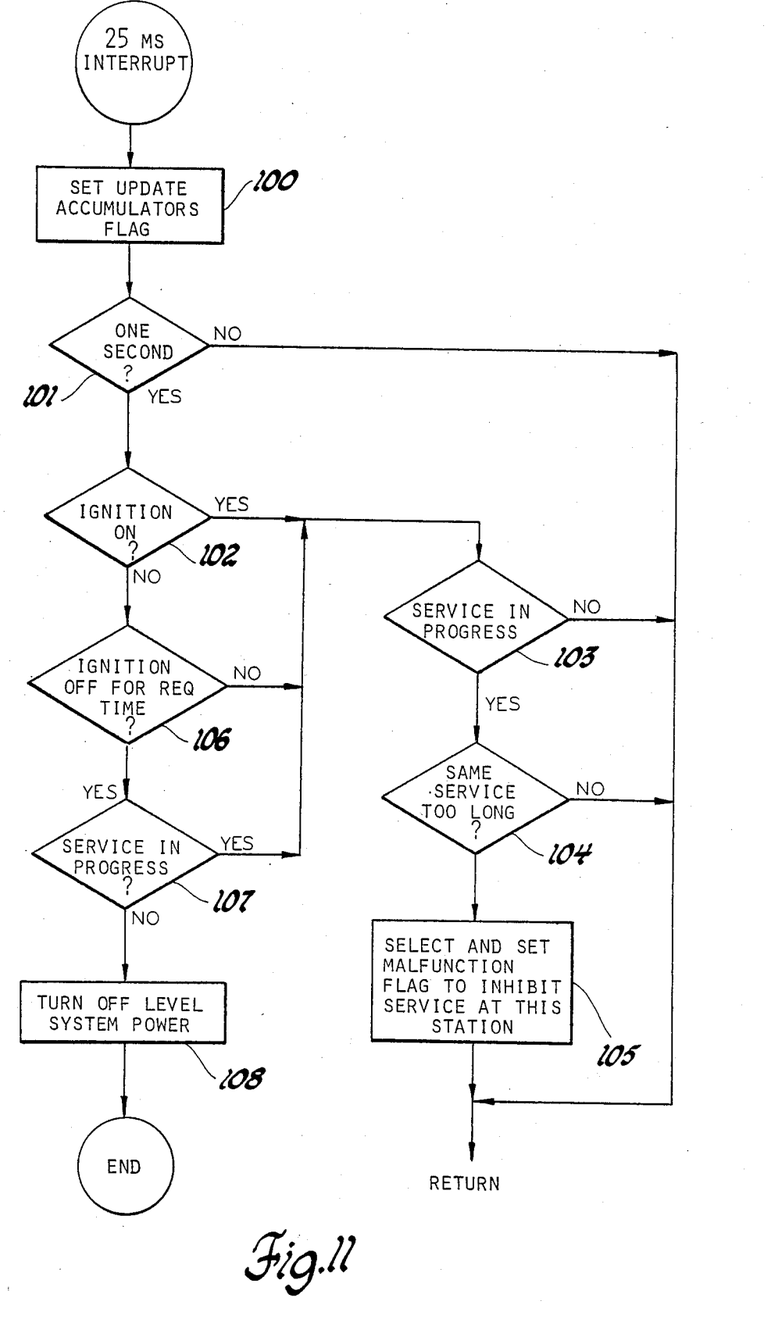

From steps 86 or 87 or the equivalent steps in the unshown portion of the flow chart entitled "F1 Trim", the program proceeds to decision point 94, in which it is determined whether any valve is open. If so, the program returns to MAINLOOP; but if not, the system ensures that the compressor is off and the exhaust valve is closed at step 95 and asks, at 96, if any service is required. If so, the program returns to decision point 76; but if not, the program ensures that all valves are closed at 97 and returns to MAINLOOP. In FIG. 11 is shown the program of the 25 millisecond interrupt. This is a program separate from the routines as described above and reachable only by means of an interrupt vector in response to an interrupt by the real time clock each 25 milliseconds.

The first step in this routine is to set the update accumulator flag, at 100. This is the only action necessary in 39 out of every 40 such interrupts. However, at one second intervals, or every fortieth interrupt, other functions are performed; and a counter keeps track of the interrupts for this purpose. The one second counter is examined at 101 and, if this is not the fortieth interrupt, the program returns to the main program with the update accumulator flag set. If this is the fortieth interrupt, however, the program asks, at 102, if the ignition is on. If it is, the program asks, at 103, if service is in progress and, if not, returns to the main program. If so, however, the program asks, at 104, if the same service has been carried on for a period longer than some reference time such as, for example, 250 seconds, which indicates a malfunction at that station. This time might vary greatly with the weight of the vehicle and volume of the fluid power apparatus. If the same service has not been in progress longer than the reference time, the program returns to the main program; but if it has, the program selects and sets a malfunction flag to inhibit further service at this station, in step 105, before returning to the main program.

If the ignition is not on at 102, the program next asks, at 106, if the ignition has been off for a predetermined required finish time, such as, for example, 120 seconds. This time is made sufficient to allow load changes from exiting passengers to be serviced. If not, the program proceeds to decision point 103; however, if so, the program proceeds to ask if service is in progress in decision point 107. If the answer is yes, the program proceeds to decision point 103; but if the answer is no, the program turns off the level system power and ends. Thus, in the interrupt routine, the program identifies and flags service malfunctions, continues operation of the system for a predetermined time after the ignition is turned off in order to complete certain actions and further continues operation of the system even after the predetermined time if service is in progress in order to complete the particular service function. It should be noted that an ignition off state causes a selection of decision mode (steps 57, 54); and that steps 67 and 68 prevent selection of cruise mode after the ignition is turned off until the interrupt routine shuts down the system.

FIG. 8 shows an alternative sensor which provides a continuous analog height signal which may be converted into a multilevel digital height signal for the level system having a greater number of levels than the three levels of the sensor shown in FIGS. 5 and 6. A rod 110 made of a magnetically responsive material and having one end pivotally attached to one of the sprung or unsprung masses of the vehicle has its other end free to move axially within a cylindrical coil inside a chamber of a sensor housing 112, housing 112 being attached to the other of the sprung and unsprung masses of the vehicle. One end of the coil is grounded and the other attached to a terminal 113 for connection to an external electronic circuit. A flexible sealing boot 114 closes the open end of sensor housing 112 around rod 110 to prevent the entry of dirt, water and other contaminants therein. Relative axial motion between rod 110 and coil 111 due to relative vertical motion between the sprung and unsprung masses of the motor vehicle causes changes in the inductance of coil 111.

The external circuit, as shown in FIG. 8, includes a voltage regulator comprising a diode 116 having an anode connected to an electric power source at 12 volts such as the vehicle battery and a cathode connected through a resistor 117 to a terminal 118. Terminal 118 is further connected to ground through a capacitor 119 and a parallel zener diode 120. Terminal 118 thus provides a regulated voltage for the emitter of the PNP bipolar transistor 121 having a base connected to the output of a square wave oscillator 122 through a resistor 123 and to the emitter through a biasing resistor 140. The collector of transistor 121 is connected through a resistor 124 to the cathode of a diode 125 having an anode connected through a resistor 126 to ground. The junction 127 of resistor 124 and diode 125 is connected by terminal 113 to coil 111. Junction 128 of diode 125 and resistor 126 is connected through a resistor 129 to the inverting input of an op amp 130 with a capacitor 131 from said inverting input to ground. The noninverting input of op amp 130 is grounded and the output is connected through a resistor 133 to ground and through a parallel resistor 134 and capacitor 135 to the inverting input. The inverting input is further connected through a resistor 136 to the regulated voltage at terminal 118.

In operation, oscillator 122 produces a square wave output to switch transistor 121 between conducting and unconducting states at a convenient frequency of, for example, 8 kilohertz. During each conductive state, current flow is built up through transistor 121, resistor 124 and coil 111. Diode 125 prevents this conduction from producing any effect at junction 128. When transistor 121 is switched to an unconducting state, current tends to continue to flow through coil 111; but this current must come through resister 126 and diode 125. Thus the junction 128 voltage spikes downward below ground and rises in an inverse exponential curve back toward ground as current flow falls off in coil 111. The inductance of coil 111, as determined by the axial position of rod 110, determines the rate at which the voltage rises toward ground at junction 128. The values of the circuit elements are adjusted so that the maximum inductance of coil 111 will still allow the voltage to return to approximate ground level before transistor 121 switches conductive once again. Naturally, lesser inductances, corresponding to rod 110 pulled further out of coil 111, will cause the voltage to approach ground at an even faster rate. Op amp 130 and its associated elements act substantially as an integrator to integrate the area under the voltage spikes and generate a positive output voltage which is an analog, with a very slight ripple, of the inductance of coil 111, and therefore of the height of the sprung mass of the vehicle relative to the unsprung mass. This analog voltage may then be converted to a digital signal in an analog to digital converter for use by the control of this invention. If a greater number of levels than the three levels of high, trim and low as shown herein is desired, certain detailed aspects of the program and flow charts would have to be adjusted; however, this could easily be done by someone skilled in the art having the knowledge of the number of levels desired.

The embodiments of the invention in which an exclusive property or privilege is claimed are defined as follows:

1. A level control system for a motor vehicle having an unsprung mass including a wheel, a sprung mass and shock absorber means connecting said sprung and unsprung masses to damp oscillatory movement between said sprung and unsprung masses excited by road surface irregularities during vehicle movement, the system further including fluid power means activatable to level the sprung mass with respect to the unsprung mass by increasing or decreasing a fluid pressure, said system further comprising:

sensor means effective to generate a signal indicating the level of said sprung mass relative to said unsprung mass;

means responsive to the sensor means to compute the difference between the total times, within a predetermined time period, spent by said level above and below a predetermined trim band; and means effective to compare said difference with a reference comprising a predetermined percentage of said total time and activate said fluid power means if said difference exceeds said reference in magnitude, whereby the system can maintain a narrow trim band while the vehicle is not moving while avoiding unnecessary corrections and cycling due to excursions above and below the trim band during vehicle movement over rough surfaces.

2. A level control system for a motor vehicle having an unsprung mass including a wheel, a sprung mass and shock absorber means connecting said sprung and unsprung masses to damp oscillatory movement between said sprung and unsprung masses excited by road surface irregularities during vehicle movement, said shock absorber means further being of the type having greater damping in extension than in compression so that said oscillatory movement differs in magnitude and period between extension and compression, the system further including fluid power means activatable to level the sprung mass with respect to the unsprung mass by increasing or decreasing a fluid pressure, said system further comprising:

sensor means effective to generate a signal indicating the level of said sprung mass relative to said unsprung mass;

means responsive to the sensor means to compute the difference between the total times, within a predetermined time period, spent by said level above and below a predetermined trim band; and means effective to compare said difference with a reference comprising a predetermined percentage of said total time and activate said fluid power means if said difference exceeds said reference in magnitude, whereby the system can maintain a narrow trim band while the vehicle is not moving while avoiding, during vehicle movement, unnecessary corrections and cycling due to excursions above and below the trim band and the tendency of the shock absorber to pull the sprung mass lower with respect to the unsprung mass.

3. A level control system for a motor vehicle having an unsprung mass including a wheel, a sprung mass and shock absorber means connecting said sprung and unsprung masses to damp oscillatory movement between said sprung and unsprung masses excited by road surface irregularities during vehicle movement, the system further including fluid power means activatable to level the sprung mass with respect to the unsprung mass by increasing or decreasing a fluid pressure in response to electrical compression and exhaust signals, respectively, said system further comprising:

sensor means effective to generate a signal indicating the level of said sprung mass relative to said unsprung mass;

at least one accumulator effective to store a number;

means effective to initialize the accumulator at zero and subsequently periodically sample the sensor means signal and increment or decrement the number therein in response to the sensor means signal if the level of the sprung mass relative to the unsprung mass is above or below, respectively, a predetermined trim band, the number therein being unchanged if the level is within the trim band; and means effective, after a predetermined number of said samples of the sensor means signal, to compare the absolute magnitude of the number in the accumulator with a predetermined reference and generate one of said compression or exhaust signals, depending on the sign of the number, if said absolute magnitude exceeds the predetermined reference, whereby the system can maintain a narrow trim band while the vehicle is not moving while avoiding unnecessary corrections and cycling due to excursions above and below the trim band during vehicle movement over rough surfaces.

* * * * *